(No Model.)
P. McDONALD.
CUTTER AND HOLDER FOR FRUITS AND FLOWERS.
No. 289,116. Patented Nov. 27, 1883.
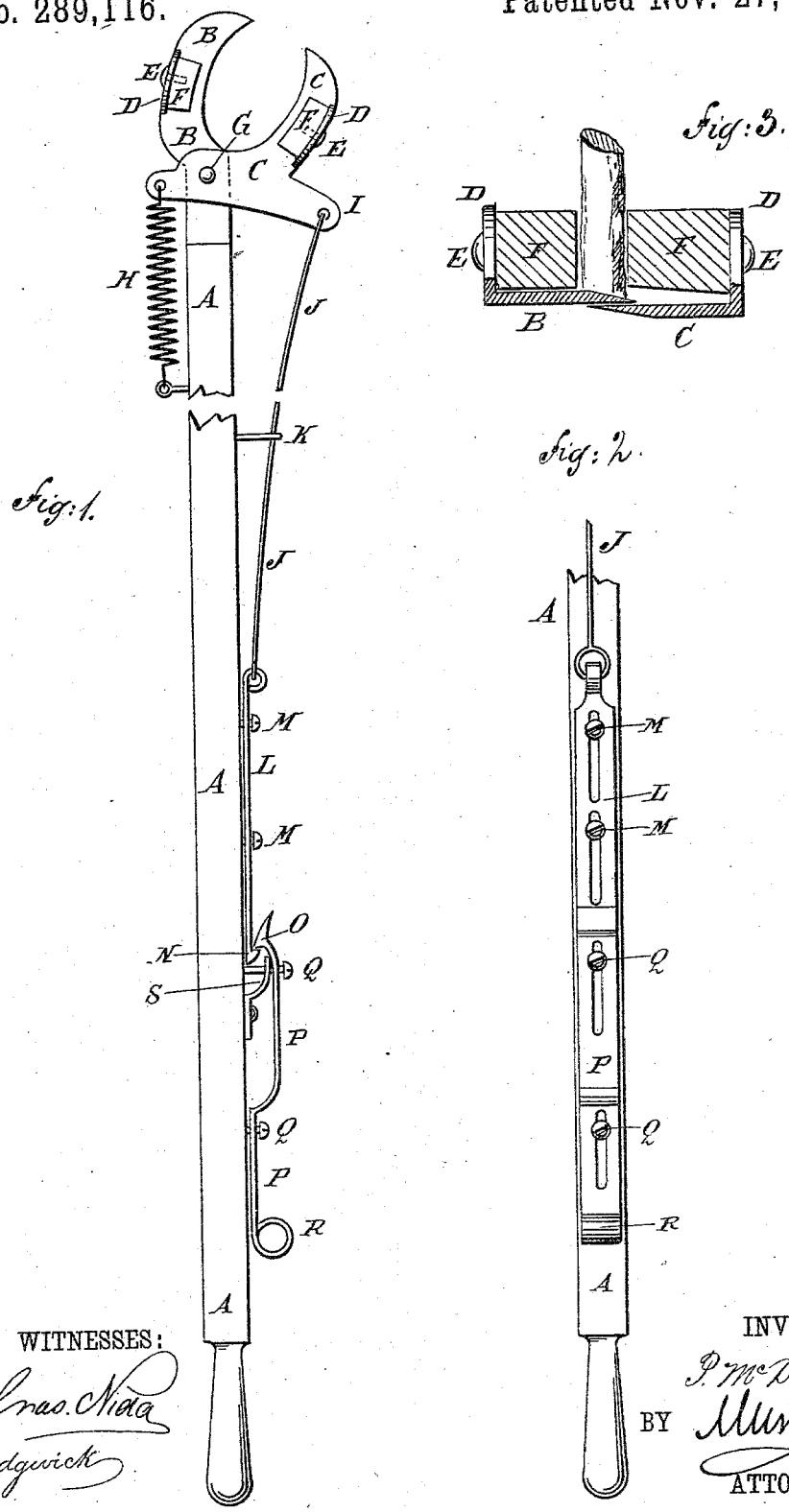
WITNESSES:
Chas. Nida
C. Sedgwick
INVENTOR:
P. McDonald
BY Munn & Co.
ATTORNEYS.

UNITED STATES PATENT OFFICE.

PETER McDONALD, OF YONKERS, NEW YORK.

CUTTER AND HOLDER FOR FRUITS AND FLOWERS.

SPECIFICATION forming part of Letters Patent No. 289,116, dated November 27, 1883.

Application filed September 28, 1883. (No model.)

*To all whom it may concern:*

Be it known that I, PETER McDONALD, of Yonkers, in the county of Westchester and State of New York, have invented a new and useful Improvement in Cutters and Holders for Fruits and Flowers, of which the following is a full, clear, and exact description.

Reference is to be had to the accompanying drawings, forming part of this specification, in which similar letters of reference indicate corresponding parts in all the figures.

Figure 1 is a side elevation of my improvement. Fig. 2 is a front elevation of the lower part of the same. Fig. 3 is a cross-section of the blades and holding-blocks enlarged.

A represents a pole of any convenient or suitable length. To the upper end of the pole A is rigidly attached a curved blade, B, having its concaved edge sharp. To the shank of the blade B is pivoted a curved blade, C, having its concaved edge sharp. To the rear edges of the blades B C are attached, or upon them are formed, projecting plates or lugs D, to which are secured, by screw E, bolts, or other suitable means, rubber blocks F, of such a thickness as to project to or nearly to the cutting-edges of the said blades, so that when the blades B C are brought together to cut the stems of fruit or flowers the rubber blocks F will grasp the said stems and hold the said fruit or flowers securely until they are lowered and placed in a basket or other receptacle, when they can be released by opening the said blades. The shank of the blade C projects beyond the pivot G, and to it is attached the end of a spiral spring, H, the other end of which is attached to a support secured to the pole A, so that the tension of the said spring will close the blades B C and hold them closed, clamping the stems of the fruit or flowers securely between the rubber blocks F. Upon the rear edge of the shank of the blade C is formed a lug, I, to which is attached the end of a wire, J, which passes through a guide eye or staple, K, attached to the pole A. The lower end of the wire J is attached to the upper end of the bar L, which is slotted longitudinally to receive the screws M, that secure it to the pole A, so that the said bar can slide longitudinally upon the said pole. The outer side of the lower end of the bar L is beveled, and has a shoulder, N, formed upon it, to engage with the shoulder O, formed upon the inner side of the upper end of the bar P, which is slotted longitudinally to receive the screws Q, that secure it to the pole A. Upon the lower end of the bar P is formed a ring, R, to receive a finger of the hand that grasps the pole A. The upper part of the bar P is curved outward, and then inward, to form a space for the trip-bar S while bringing the shoulder or hook O into proper position to engage with the shoulder or hook N of the bar L. The trip-bar S is so formed that a slight downward pull upon the bar P will cause the said trip-bar to raise the shoulder O off the shoulder N.

In using the implement the bar P is pushed upward, causing the shoulder O to engage with the shoulder N of the bar L, and the bars L P are then drawn downward, opening the blades B C. The implement is then adjusted to bring the stem of the fruit or flower to be gathered between the blades B C, the bar P is drawn downward a little farther, causing the trip-bar S to raise the shoulder O off the shoulder N, when the spring H will close the blades B C, cutting the stem, and causing the blocks F to grasp the said stem and hold the said fruit or flower until it has been lowered into some suitable receptacle and the blades B C have been opened by again operating the bar P to release the said fruit or flower.

Having thus described my invention, what I claim as new, and desire to secure by Letters Patent, is—

1. In a cutter and holder for fruits and flowers, the combination, with the pivoted blade C, having lug I, of the wire J, the sliding bar L, having shoulder N, and the sliding bar P, having shoulder O, as set forth.

2. In a cutter and holder for fruits and flowers, the combination, with the pole A and the sliding bars L P, having shoulders N O, of the trip-bar S, substantially as herein shown and described, whereby the bars L P will be disengaged by the downward movement of the said bar P, as set forth.

PETER McDONALD.

Witnesses:
FRANCIS A. FITZELY,
CHARLES JAMES BOLLING.